Sept. 6, 1932.  R. P. HARVEY  1,876,414
BEAD CLOSING MECHANISM FOR TIRE WRAPPING MACHINES
Filed Aug. 18, 1927  2 Sheets-Sheet 1
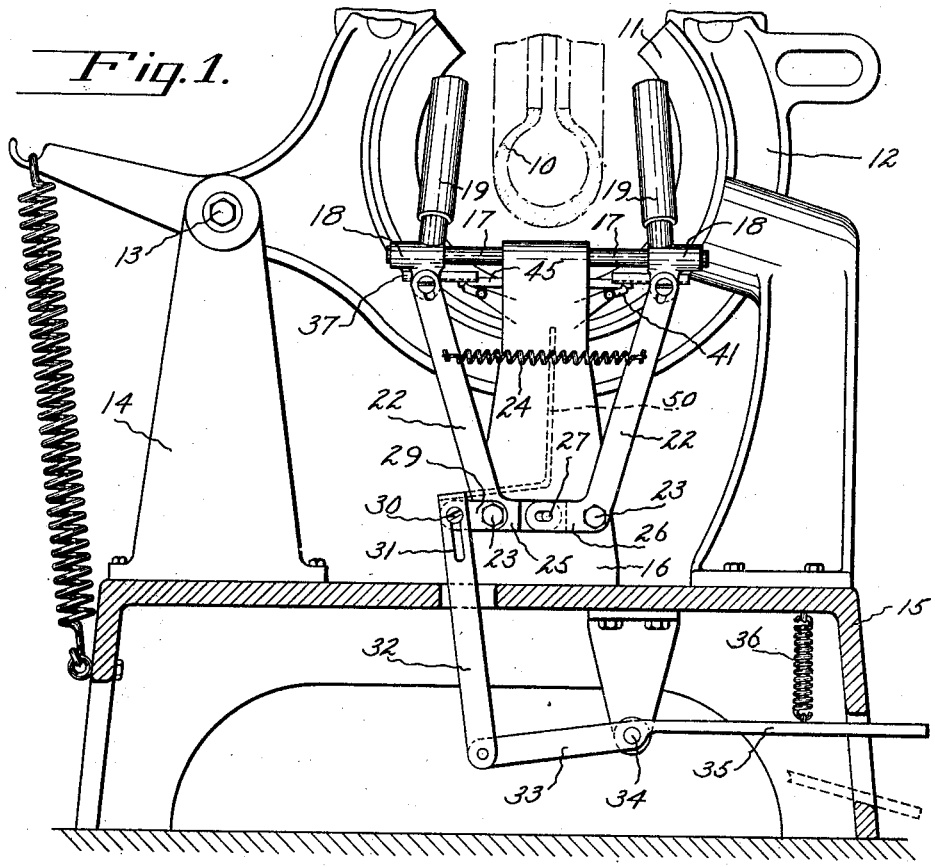
Fig. 1.
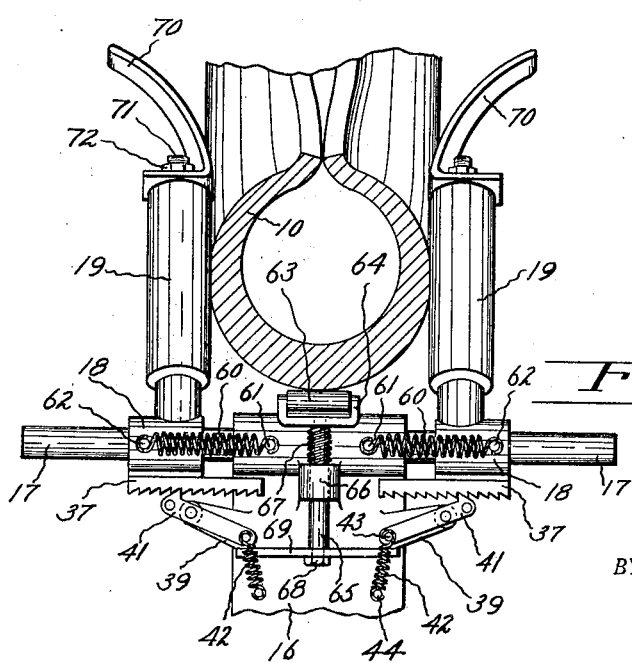
Fig. 2.
Fig. 3.
INVENTOR.
Robert P. Harvey
BY Edward C. Taylor
ATTORNEY.

Sept. 6, 1932.  R. P. HARVEY  1,876,414
BEAD CLOSING MECHANISM FOR TIRE WRAPPING MACHINES
Filed Aug. 18, 1927  2 Sheets-Sheet 2
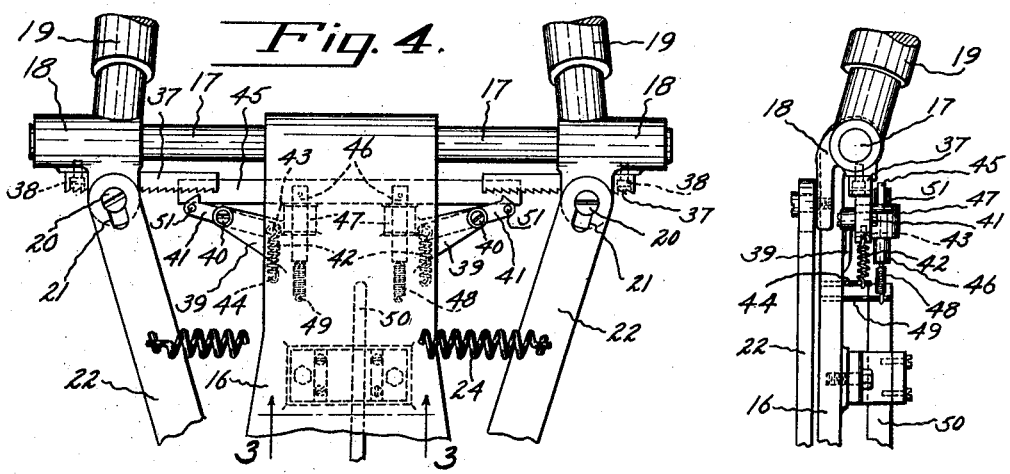
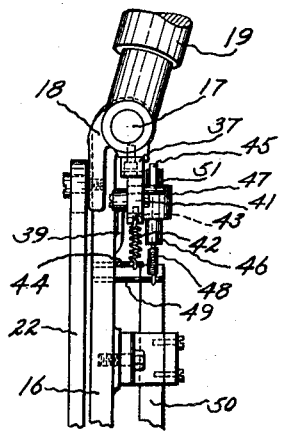
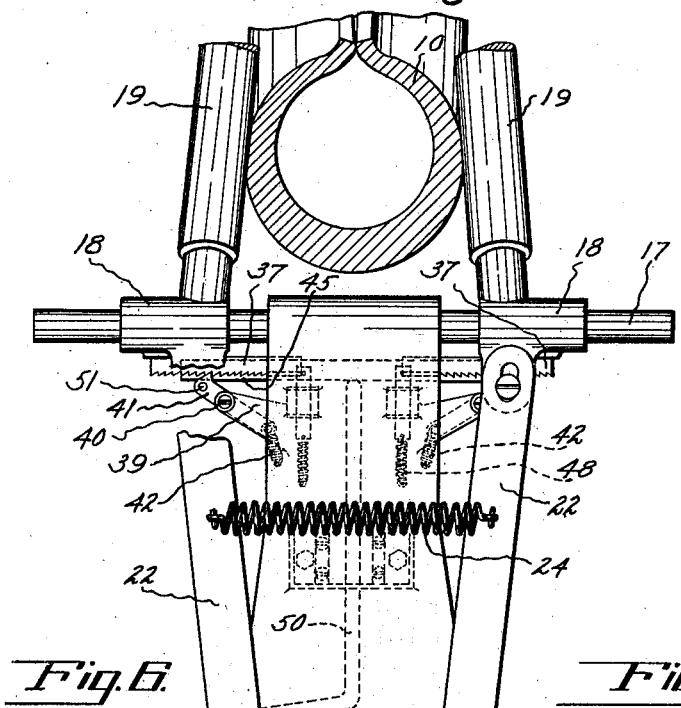
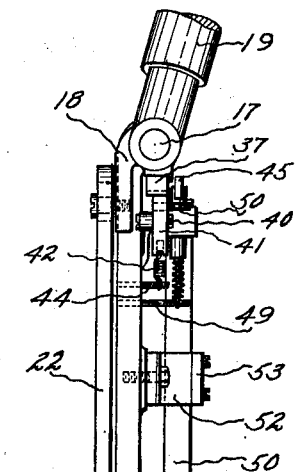
INVENTOR.
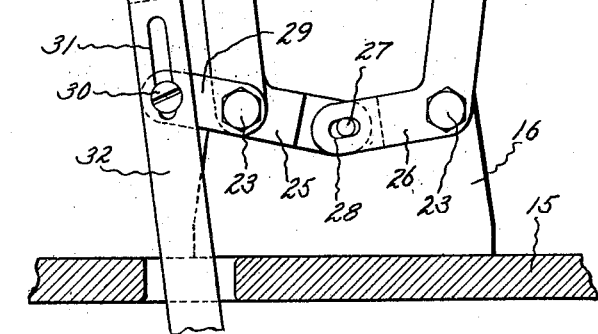
BY
ATTORNEY.

Patented Sept. 6, 1932

1,876,414

UNITED STATES PATENT OFFICE

ROBERT P. HARVEY, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS

BEAD CLOSING MECHANISM FOR TIRE WRAPPING MACHINES

Application filed August 18, 1927. Serial No. 213,850.

Pneumatic vehicle tires are customarily prepared for sale by enclosing them within a helical wrapping of paper. To insure tightness in the wrap, to avoid as far as possible undue strains on the paper when wrapping at high speeds, and to keep down the amount of paper required, machines for applying this wrapping to tires are customarily provided with mechanism for pressing together the bead edges of the tire. It is my present object to improve bead closing mechanism of this general type by making this mechanism automatically accommodate itself to the size of whatever tire may be placed in the machine; and to do this by simple mechanism involving no extra operating effort, exerting no more pressure than necessary to keep the beads closed, and acting by holding the beads into the position into which they are forced by the operator when he closes them about the end of the paper strip in starting the machine.

Referring to the drawings,

Fig. 1 is a side elevation of a tire wrapping machine embodying my invention, features unrelated to the bead closing devices being omitted for clarity in illustration;

Fig. 2 is a detail corresponding to a portion of Fig. 1 but showing a modification;

Fig. 3 is a detail section on line 3—3 of Fig. 4;

Fig. 4 is a detail corresponding to a portion of Fig. 1, but on a larger scale;

Fig. 5 is a side elevation of that part of the mechanism shown in Fig. 4;

Fig. 6 is a view corresponding generally to Fig. 4, but showing the parts in bead closing position; and Fig. 7 is a side elevation of the mechanism shown in Fig. 6.

The invention has been shown as applied to a tire wrapping machine of a conventional type, in which the tire 10 is mounted so as to rotate through and in a plane at right angles to a shuttle 11. The shuttle is mounted for rotation in a carrier 12, here shown as pivoted at 13 to a pedestal 14 arising from the main frame 15. Driving mechanism for rotating the tire and the shuttle has not been illustrated as it may be of any conventional type and is not necessary for an understanding of my invention.

The bead closing mechanism is carried upon a pedestal 16, at the top of which are mounted oppositely extending rods 17 upon which slide carriers 18. Each carrier supports a roll 19, positioned to contact with the tire to hold the beads closed. Each carrier is also provided with a pivot pin 20 extending through a slot 21 in one of a pair of arms 22 pivoted at 23 to the pedestal 16, the arms being urged towards each other by a spring 24. Interfitting extensions 25 and 26 on the arms are fitted with a stud 27 and a slot 28 respectively, so that the arms are always constrained for equal pivotal movement in opposite directions.

To one of the arms 22 is secured a projection 29 bearing a stud 30 running freely in a slot 31 formed in a link 32. The lower end of this link is pivoted to a crank 33 fixed upon the same shaft 34 as a treadle 35. A spring 36, of more force than the spring 24, normally keeps the parts in the position of Fig. 1. When the treadle is depressed the arms 24 are permitted to approach each other under the pull of spring 24 until the rolls 19 contact with the sides of the tire. Further depression of the treadle is without effect upon the arms on account of the lost motion connection provided by slot 31. The treadle 35 may conveniently be used through any suitable clutch connection for starting the machine, since the application of the bead closers coincides with the starting of the wrapping operation. Mechanism for this purpose has, however, not been illustrated as it has no direct bearing upon the description of my invention.

A ratchet 37 is secured as by a screw 38 to each of the carriers 18. To brackets 39 at each side of the pedestal 16 are pivoted at 40 pawls 41 which, when in engagement with ratchets 37, prevent outward movement of the carriers. The pawls are constantly urged towards the ratchets by springs 42, each stretched between a pin 43 on the pawl and a pin 44 on the pedestal. At certain times, however, the pawls are held out of contact with the ratchets by a bar 45, provided with guides 46 running in bearings 47 on the pedestal and held by springs 48 stretched between the guides and stationary pins 49. When permitted by an extension 50 of the link 32, the bar is pulled down by springs 48 onto pins 51 carried by the pawls, these springs having greater force than the springs 42 attached to the pawls. The upper end of the extension 50 contacts when in its upper position with the lower side of bar 45, and is conveniently guided by a bearing 52 having a cap piece 53.

In starting the wrapping of a tire upon the conventional form of machine the operator takes the end of the paper strip, the body of which is mounted upon a spool on the shuttle 11, tucks it between the tire beads, and starts the machine, meanwhile pinching the beads together upon the paper strip to hold it in place. I utilize this operation for the actuation of the bead closing devices. With the tire placed in the machine as in Fig. 1 the operator tucks the paper strip between the beads and with his hand presses the beads tightly together at this point. He then depresses treadle 35 to release the bead closing mechanism, and concurrently starts the machine, preferably by the same treadle. As the treadle descends the rolls 19 are allowed to close in upon the sides of the tire, which have been pressed together as described to close the beads. After this contact has been made, further depression of the treadle produces no effect upon the position of the bead closers, which rest against the tire with the light pressure of spring 24. As the treadle reaches its lower limit the extension 50 raises the bar 45 and releases the pawls, which are then carried by their springs into contact with the ratchets 37 and prevent any outward movement of the bead closers. These having once been placed in the position necessary to hold the beads closed, remain in this position during the completion of the wrapping operation, and progressively close the tire beads as the tire rotates.

When the treadle is released upon the completion of the wrapping cycle the extension 50 withdraws from contact with the bar 45, and the springs 48 attached to the latter pull it down against the lesser force of springs 42. The bar strikes upon pins 51 and swings the pawls out of engagement with the ratchets. The rolls 19, however, remain in engagement with the tire until the parts are returned to the inactive position of Fig. 1 by the contact of pin 30 with the end of slot 31.

In the modification shown in Fig. 2 the linkage connecting the bead closers to the starting treadle has been omitted, and the bead closers actuated solely by the tire. The bead closers 19 and their mounting on carriers 18 remain the same as before, but instead of the spring 24 operating upon the arms 22 a pair of springs 60 are employed, stretched between pins 61 on the pedestal 16 and pins 62 on the carriers. A roller 63 is mounted for rotation in a yoke 64 carried by a rod 65 movable vertically in a bearing 66. A spring 67 constantly urges the roller 63 upwardly. The lower end of rod 65 is secured by a nut 68 to a bar 69 extending sidewise into a position to engage the pawls 41 and shift them out of the position of Fig. 1 so that the ratchets 37 are freed. Spring 67 is stronger than the combined force of springs 42, so that when a tire is not in place it will keep the pawls out of contact with the ratchets. The weight of a tire, however, overbalances the spring 67, and presses the rod down, freeing the pawls and permitting springs 42 to swing them against the ratchets and hold the rolls 19 against separation. In order to permit introduction of the tire into the machine to open the bead closing members, horns 70 are fixed to the pivot pins 71 of rolls 19 by nuts 72.

Considering the operation of this modified form of mechanism, it should be noted that the rolls 19 are pressed together by springs 60 when the machine is inactive, instead of being held apart by the action of treadle operated linkage as in the form previously described. The roll 63 is in its uppermost position, and the ratchets 37 therefore free from the pawls 41. The curved surfaces of the horns 70 permit the easy introduction of a tire; the horns 70, and the rollers 19 to which they are attached, moving gradually apart as the tire is forced into place. The pressure of springs 60 is preferably not great enough to close the beads, as this would cause some difficulty in inserting and removing tires particularly of the larger sizes. The rollers 19 do, however, remain in light contact with the tire sides as the tire is inserted in the machine. When the tire reaches its final position it depresses roll 63 and by the consequent lowering of bar 69 releases the pawls for contact with the ratchets. If the operator now manually closes the beads, or if these are temporarily closed by any other means, the springs 60 will cause the rolls 19 to follow the pawls clicking over the ratchets during this movement. The pawl and ratchet mechanism, while not interfering with the movement of the rolls 19 inwardly, does hold the rolls in bead closing position during the subsequent wrapping operation. When the tire is removed the roll 63 is released, and the pawls are freed from the ratchets so that the tire may easily force the rolls 19 further apart if necessary during its removal.

Having thus described my invention, I claim:

1. In a tire wrapping machine, bead closing mechanism comprising a pair of tire engaging members spring-pressed together, ratchet means for holding the members against outward movement from a position determined by their contact with the sides of the tire, means for separating the members to remove them from contact with the tire, and connections between said separating means and the ratchet means for disengaging the latter.

2. In a tire wrapping machine, bead closing mechanism comprising a pair of tire engaging members, a spring for forcing the members lightly against the sides of the tire, means having a lost motion connection with the members for drawing them away from the tire, pawl and ratchet mechanism holding the members against movement away from the tire, and mechanism operative between said means and the pawl and ratchet mechanism for rendering the latter inoperative during the action of said means.

3. In a tire wrapping machine, opposed tire engaging members, normally yielding means acting to hold said members adjacent each other but permitting their separation by the insertion of a tire between them without distortion of the tire, and a pawl and ratchet mechanism actuated by the complete insertion of the tire between the members for preventing outward movement of the members while leaving the latter free to follow the engaged portions of the tire inwardly when the tire beads are moved together by extraneous means.

ROBERT P. HARVEY.